US009317322B2

United States Patent
Kriesing

(10) Patent No.: US 9,317,322 B2
(45) Date of Patent: Apr. 19, 2016

(54) SIMULATING SYNCHRONOUS EXECUTION OF ASYNCHRONOUS OPERATIONS

(71) Applicant: Google Technology Holdings LLC, Mountain View, CA (US)

(72) Inventor: Wolfram Kriesing, Munich (DE)

(73) Assignee: Google Technology Holdings LLC, Mountain View, CA (US)

(*) Notice: Subject to any disclaimer, the term of this patent is extended or adjusted under 35 U.S.C. 154(b) by 519 days.

(21) Appl. No.: 13/659,277

(22) Filed: Oct. 24, 2012

(65) Prior Publication Data

US 2014/0115024 A1 Apr. 24, 2014

(51) Int. Cl.
*G06F 15/16* (2006.01)
*G06F 9/48* (2006.01)
*G06F 9/455* (2006.01)

(52) U.S. Cl.
CPC .......... *G06F 9/4843* (2013.01); *G06F 9/45512* (2013.01)

(58) Field of Classification Search
CPC .................................................. G06F 9/45512
USPC ....................................................... 709/201
See application file for complete search history.

(56) References Cited

U.S. PATENT DOCUMENTS

| 5,261,097 | A | * | 11/1993 | Saxon | 718/106 |
| 7,950,018 | B2 | * | 5/2011 | Peller et al. | 719/312 |
| 2013/0318142 | A1 | * | 11/2013 | Jin Eo et al. | 709/201 |

OTHER PUBLICATIONS

Zhang et al. "Parallelizing the Execution of Sequential Scripts," International Conference on eScience (eScience '08), pp. 222-229, 2008.*

* cited by examiner

*Primary Examiner* — Kevin Bates
*Assistant Examiner* — Chen-Liang Huang
(74) *Attorney, Agent, or Firm* — Byrne Poh LLP

(57) ABSTRACT

A computer-implemented method is presented here. The method obtains a script to be executed, wherein the script includes instructions for an asynchronous operation, and wherein the asynchronous operation includes a request calling for a result. The method continues by performing a provisional iteration of the script, wherein the provisional iteration of the script is associated with at least a portion of the script, and wherein the provisional iteration of the script obtains and saves the result as a cached result. Thereafter, a final iteration of the script is performed using the cached result.

20 Claims, 3 Drawing Sheets

SIMULATING SYNCHRONOUS EXECUTION OF ASYNCHRONOUS OPERATIONS

TECHNICAL FIELD

Embodiments of the subject matter described herein relate generally to computer science, execution of software instructions, and related technologies. More particularly, embodiments of the subject matter relate to the management and execution of executable scripts having asynchronous operations.

BACKGROUND

The prior art includes computer hardware, software architectures, programming languages, and associated techniques for executing software instructions. An executable script is usually defined as a small, simple, or lightweight software program that, when executed, performs a number of tasks, operations, commands, or functions. For example, a script could be written to launch a remote web browser application, direct the remote web browser application to a designated web page, set variables or parameters for a computing device, and the like. One type of simple and straightforward script only includes synchronous operations that are intended to be performed in a sequential manner, e.g., line-by-line or operation-by-operation as reflected by the code that defines the script. Another type of script includes one or more asynchronous operations that require some form of response or result, where the time of receipt of the response or result may not be known. Thus, one or more subsequent operations could be executed while the result of a previously executed asynchronous operation is still pending.

Synchronous scripts are relatively straightforward to write and many software developers are familiar with the manner in which synchronous scripts are written and executed. In contrast, many people remain unfamiliar with asynchronous development concepts even though by design it may be necessary to develop scripting code that performs one or more asynchronous operations. Unfortunately, it can be very difficult to create a script having asynchronous steps using basic concepts and design approaches that are traditionally reserved for use with synchronous scripts.

Accordingly, it is desirable to have a scripting methodology that addresses the shortcomings and deficiencies of existing approaches that typically apply only to synchronous scripts. In addition, it is desirable to have a computer-implemented module, interface, or script manager that can handle a script that includes one or more asynchronous operations that have been written in a way that emulates a synchronous script. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium that stores non-transient program instructions for execution by a processor of a computing device. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

Figure 1:
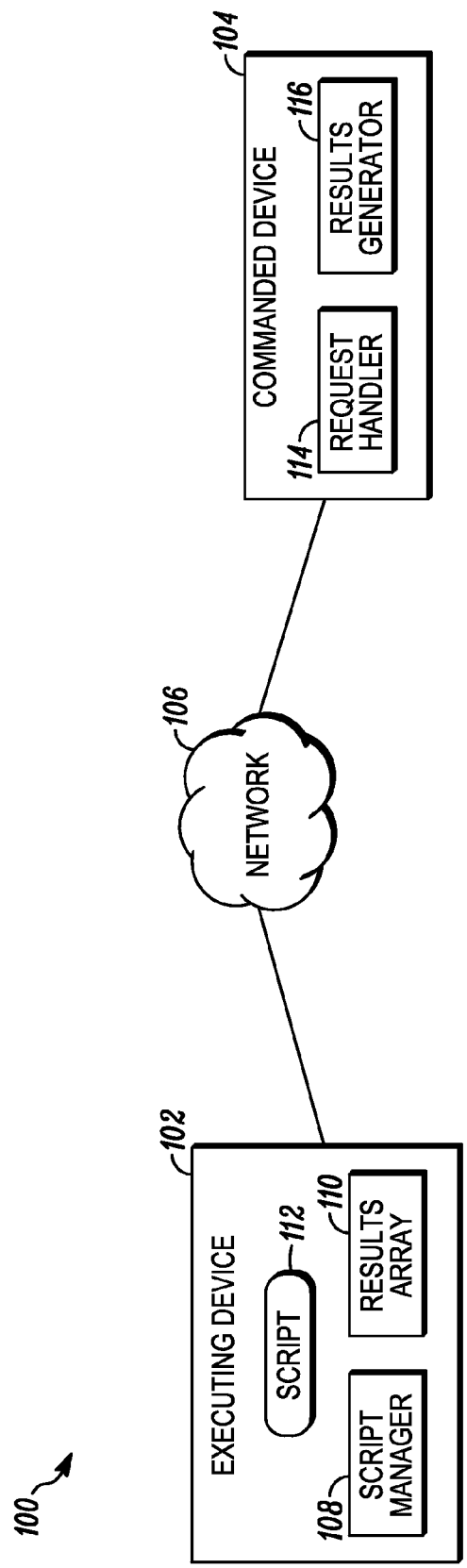
FIG. 1 is a simplified schematic representation of an embodiment of a computing environment.

Turning now to the drawings, FIG. 1 is a simplified schematic representation of an embodiment of a computing environment 100. The computing environment 100 is suitably configured to support the script execution and management techniques and approaches described here. Although certain embodiments described here relate to a web-based system, the techniques and methodologies can be utilized in other types of network arrangements. Moreover, the simplified computing environment 100 shown and described here represents only one possible embodiment of a system that is capable of simulating synchronous execution of asynchronous operations. The illustrated embodiment of the computing environment 100 includes, without limitation: an executing device 102; a commanded device 104; and a data communication network 106 that operatively couples the executing device 102 to the commanded device 104. The executing device 102 may also be referred to here as a client device, and the commanded device 104 may also be referred to here as a server device. The environment 100 is preferably realized as a computer-implemented system in that the executing device 102 and the commanded device 104 are each configured as a computer-based electronic device, system, or architecture.

The executing device 102 may be implemented using any suitable hardware platform. In this regard, the executing device 102 may be realized in any common form factor including, without limitation: a desktop computer; a mobile computer (e.g., a tablet computer, a laptop computer, or a netbook computer); a smartphone; a video game device; a digital media player; a piece of home entertainment equipment; or the like. The executing device 102 is realized as a computer-implemented or computer-based device having the hardware, software, firmware, and/or processing logic needed to carry out the processes described in more detail herein. For example, the executing device 102 may include a script manager 108 and a results array 110 that cooperate to execute, handle, and otherwise manage an executable script 112 for the executing device 102.

The script manager 108 may be realized in an abstraction layer to serve as an interface between the executable script 112 and the commanded device 104. In practice, the script manager 108 may be implemented as a logical software module having suitable program instructions that are written to support the execution and handling of the script 112 and any operations defined by the script 112. For example, the functionality of the script manager 108 may be provided in the form of a non-transitory computer-readable storage medium that resides at the executing device 102, where the computer-readable storage medium includes computer-executable instructions stored thereon. When executed, the stored instructions instruct one or more processors of the executing device 102 to perform the various script execution and management tasks, processes, and methods described here.

The results array 110 represents a database or other construct that is realized in a suitably formatted memory element of the executing device 102. The results array 110 is arranged and configured to store cached results that correspond to executed asynchronous operations, such that the cached results can be accessed, retrieved, and used as needed by the script manager 108. The functionality of the script manager 108 and the results array 110 will be described in more detail below with reference to FIG. 4.

The commanded device 104 may be implemented using any suitable hardware platform, including any of the form factors mentioned previously for the executing device 102. The commanded device 104 is realized as a computer-implemented or computer-based device having the hardware, software, firmware, and/or processing logic needed to carry out the processes described in more detail herein. For example, the commanded device 104 may include a request handler 114 and a results generator 116 that cooperate to receive, process, and respond to commands or requests issued by the script 112.

The request handler 114 may be implemented as a logical processing module of the commanded device 104 that is suitably configured to receive requests or commands that correspond to asynchronous operations defined by the script 112. In this regard, as the script 112 executes at the executing device 102, an asynchronous operation may command an action, process, or routine to be performed at the commanded device 104. Consequently, execution of the asynchronous operation may issue a suitably formatted request (or multiple requests) intended for the commanded device 104. The issued request is received and handled by the request handler 114, which in turn causes the commanded device 104 to take the necessary action.

The results generator 116 may be implemented as a logical processing module of the commanded device 104 that is suitably configured to generate appropriate results (corresponding to asynchronous operations) and to send the results back to the executing device 102. In practice, a result prepared by the results generator 116 may represent certain data that is to be returned to the executing device, a confirmation or acknowledgment, a file, a script, or the like.

Although not always required, the commanded device 104 may be a physically remote piece of hardware, relative to the location of the executing device 102. For example, the commanded device 104 may be a computer system having a web browser application that can be remotely launched, controlled, or operated by the script 112. In practice, therefore, the executing device 102 and the commanded device 104 could be located in different buildings, different cities, different states, different countries, etc. Notably, the executing device 102 and the commanded device 104 may be considered to be "remote" devices even if there is little to no physical distance separating them. For example, the executing device 102 could be located in the same building or room as the commanded device 104.

The data communication network 106 provides and supports data connectivity between the executing device 102 and the commanded device 104 as needed. In practice, the data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Figure 2:
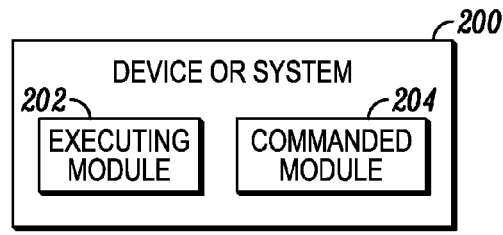
FIG. 2 is a simplified schematic representation of an embodiment of a computer-based device or system.

The script handling methodologies described in more detail below may also be implemented in one computer-based device, system, or architecture (rather than in a networked arrangement of different devices as depicted in FIG. 1). In this regard, FIG. 2 is a simplified schematic representation of an embodiment of a computer-based device or system 200. The system 200 may represent, for example, a single computing device, a multi-processor device in a shared housing, one partition in a multiple partition processing environment, or the like. The illustrated embodiment generally includes at least two primary processing modules, logical components, or software-implemented elements: an executing module 202 and a commanded module 204. Although not shown in FIG. 2, the executing module 202 preferably includes or cooperates with a script manager and a results array (see FIG. 1) to handle the execution and management of a script having one or more asynchronous operations. Similarly, although not shown in FIG. 2, the commanded module 204 preferably includes or cooperates with a request handler and a results generator to receive requests, take appropriate action, generate results, and provide the results to the executing module 202. In other words, the system 200 may be suitably configured and designed to execute asynchronous scripts in a manner that is functionally equivalent to that provided by the computing environment 100 shown in FIG. 1.

It should be appreciated that the script executing and management processes and methodologies described here could be utilized in any number of different computer-based systems, arrangements, architectures, and configurations, and that FIG. 1 and FIG. 2 merely depict two possible embodiments. The arrangements shown in FIG. 1 and FIG. 2 are not intended to limit or otherwise restrict the scope or application of any embodiment contemplated by this description.

Figure 3:
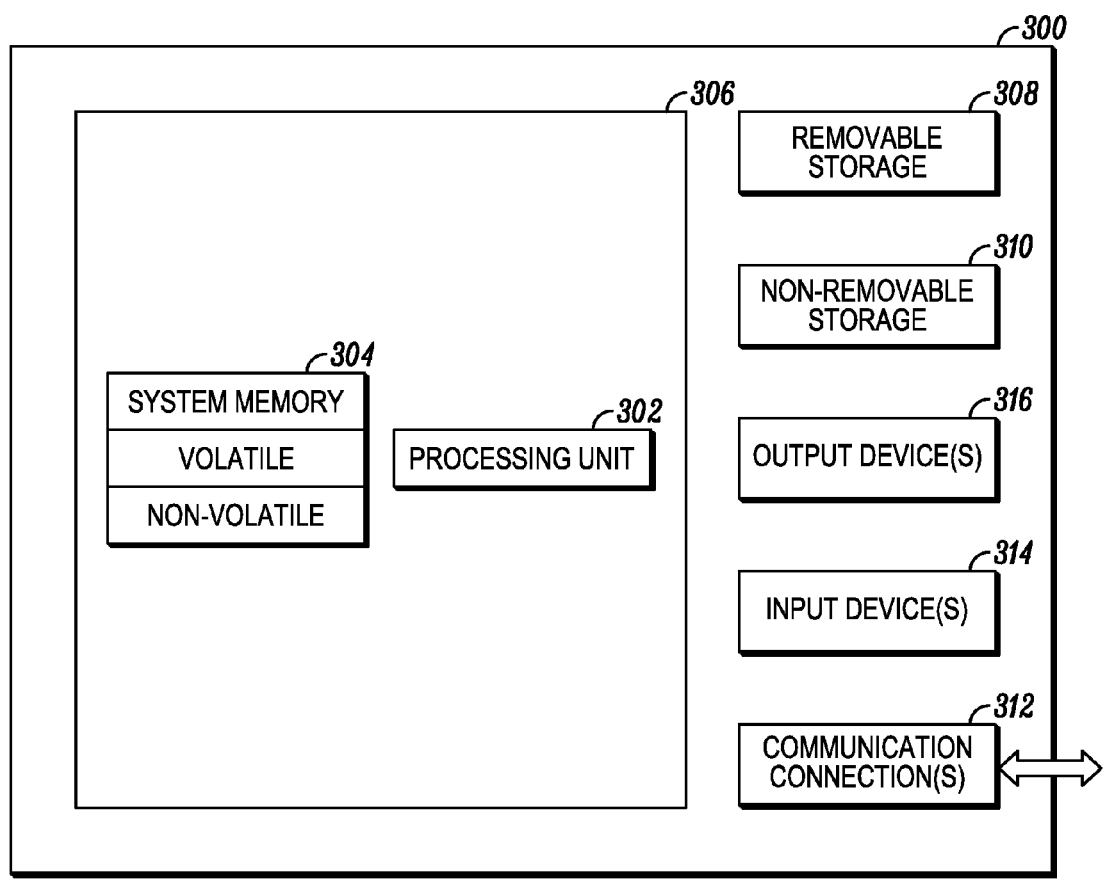
FIG. 3 is a simplified schematic representation of an embodiment of a computer-based system.

As mentioned above, a number of script handling operations and functions can be performed by one or more computer-based devices. In this regard, FIG. 3 is a simplified schematic representation of an exemplary computer-based system 300 for implementing an embodiment of a script executing device. Indeed, the computer-based system 300 described here could be used to implement the executing device 102 shown in FIG. 1 or the system 200 shown in FIG. 2. Moreover, the commanded device 104 shown in FIG. 1 could be configured in accordance with the computer-based system 300.

The system 300 is only one example of a suitable operating environment and is not intended to suggest any limitation as to the scope of use or functionality of the inventive subject matter presented here. Other well-known computing systems, environments, and/or configurations that may be suitable for use with the embodiments described here include, but are not limited to, personal computers, server computers, hand-held or laptop devices, wireless electronic devices (including cellular devices, video game devices, and digital music players), multiprocessor systems, microprocessor-based systems, network PCs, minicomputers, mainframe computers, distributed computing environments that include any of the above systems or devices, and the like.

The system 300 and certain aspects of the exemplary script handling systems may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The system 300 typically includes at least some form of computer readable media. Computer readable media can be any available media that can be accessed by the system 300 and/or by applications executed by the system 300. By way of example, and not limitation, computer readable media may comprise tangible computer storage media, non-transitory computer storage media, and the like. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computer-based system 300.

Referring again to FIG. 3, in its most basic configuration, the system 300 typically includes at least one processing unit 302 and a suitable amount of memory 304. Depending on the exact configuration and type of platform used for the system 300, the memory 304 may be volatile (such as RAM), non-volatile (such as ROM, flash memory, etc.) or some combination of the two. This most basic configuration is identified in FIG. 3 by reference number 306. Additionally, the system 300 may also have additional features/functionality. For example, the system 300 may also include additional storage (removable and/or non-removable) including, but not limited to, magnetic or optical disks or tape. Such additional storage is represented in FIG. 3 by the removable storage 308 and the non-removable storage 310. The memory 304, removable storage 308, and non-removable storage 310 are all examples of computer storage media as defined above.

The computer-based system 300 may also contain communications connection(s) 312 that allow the system to communicate with other devices. For example, the communications connection(s) could be used to establish data communication between the system 300 and other computer-based devices, systems, or terminals. For example, the communications connection(s) 312 may be associated with the communication of script instructions, command requests, command results, requested data or files, and the like.

The system 300 may also include or communicate with various input device(s) 314 such as a keyboard, mouse or other pointing device, pen, voice input device, touch input device, etc. Although the exemplary embodiment described herein utilizes a mouse device, certain embodiments can be equivalently configured to support a trackball device, a joystick device, a touchpad device, or any type of pointing device. The system 300 may also include or communicate with various output device(s) 316 such as a display, speakers, printer, or the like. All of these devices are well known and need not be discussed at length here.

The systems, methodologies, and techniques described here can be utilized to provide a simple scripting interface to developers who are not familiar with asynchronous development concepts but are tasked with the creation of code that executes some asynchronous steps. A script execution and management technique effectively hides the asynchronous nature of the execution from the developer, thus allowing the developer to write a script in a format that is similar or identical to traditional formats used for synchronous operations.

As used here, an "asynchronous operation" may be defined as an operation, task, or instruction that need not have any particular time coincidence relative to another event, time reference, or operation. In this regard, an asynchronous operation may be an operation that occurs without any regular or predictable time relationship relative to another operation. For example, in the context of an executable script, an asynchronous operation is an instruction that might be triggered by some event in the future and not necessarily synchronized in the overall flow of the program or script. Accordingly, each asynchronous operation specified in an executable script may include a request calling for a corresponding result, such that completion of the script is associated with a number of results associated with a number of asynchronous operations. In certain embodiments, each asynchronous operation includes a request intended for a remote computing device, and the remote computing device generates a corresponding result in response to receiving and processing the request.

As used here, a "synchronous operation" may be defined as an operation, task, or instruction that has some particular restraint, relationship, or association with time, such as a time cycle, a periodicity, or the like. In this regard, a synchronous operation may be an operation that is initiated by or otherwise regulated by a clock or a timer in a predictable manner. For example, in the context of an executable script, synchronous operations are instructions that are executed in a given order, and not interrupted by any other instruction in the script or program. In certain practical embodiments, a synchronous operation may be executed to assign a value to one or more variables, to reset or clear a memory location, to access data, or the like.

In certain exemplary embodiments, an executable script having a plurality of asynchronous operations is provisionally "executed" multiple times (the specific number of iterations is influenced by the number of asynchronous calls in the script). The system caches the results of the asynchronous operations and returns previously cached values of asynchronous operations on subsequent provisional execution iterations. This allows the script to advance to the next asynchronous step. Thus, provisionally executing an asynchronous step that does not have an associated cached result terminates the provisional execution routine until the result is returned and cached, at which point the script is re-executed from the beginning. In practice, the list of expected asynchronous results may be initialized to an empty results array resident at the script executing device. The results array is populated in an ongoing manner with each provisional execution of the script. The script can be run in a synchronous manner after all of the expected results have been cached in the results array. In practice, therefore, the methodology presented here effectively simulates synchronous execution of asynchronous operations included in an executable script.

The methodology described here is also effective for loops within a script, where each asynchronous call executed within a loop simply forces one more result into the results array. The results are read back in sequential order, such that each provisional iteration of the loop is able to retrieve the corresponding results in the correct order.

Figure 4:
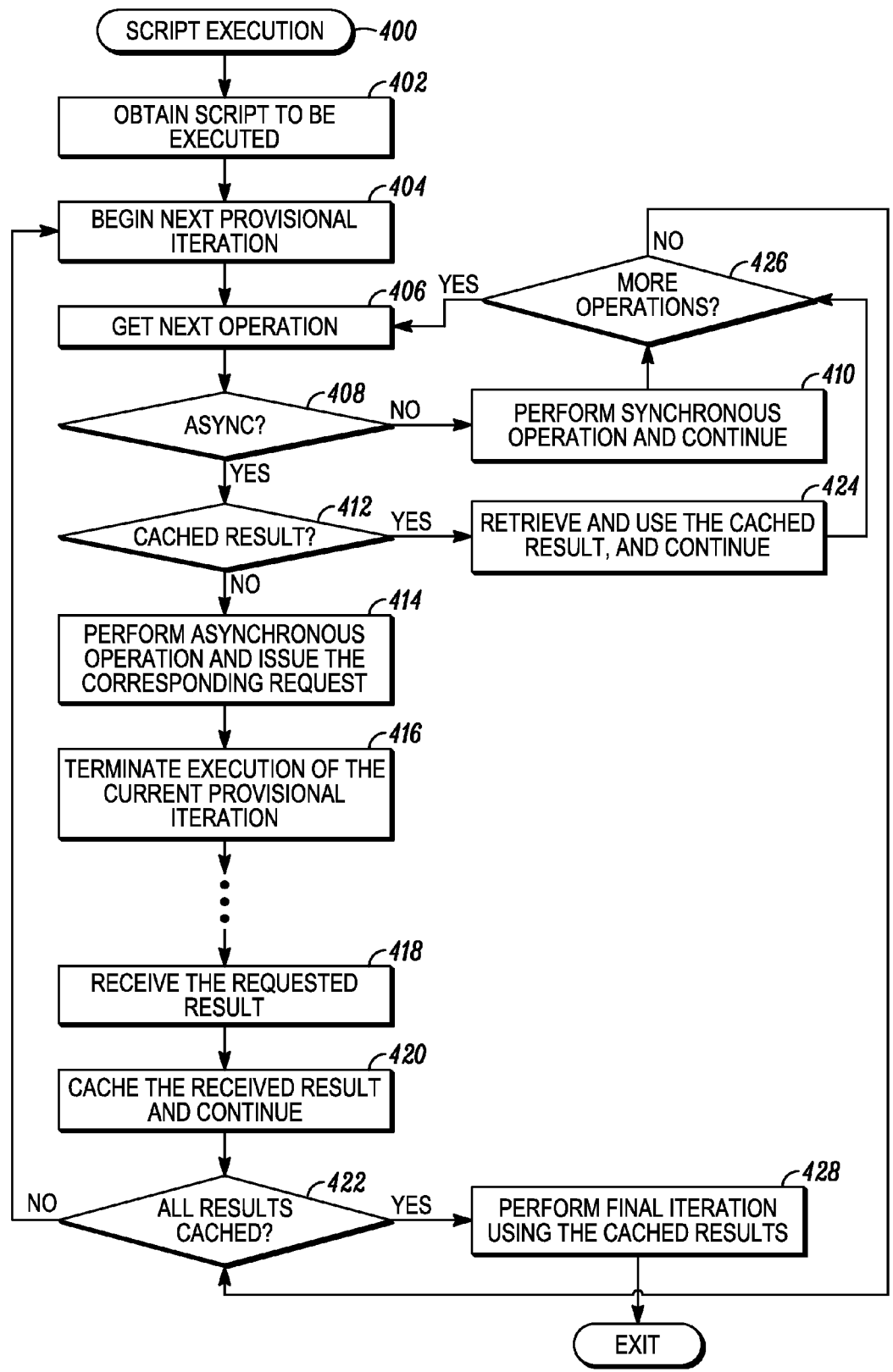
FIG. 4 is a flow chart that illustrates an embodiment of a script execution process.

FIG. 4 is a flow chart that illustrates an embodiment of a script execution process 400 that handles executable scripts having one or more asynchronous operations. The various tasks performed in connection with the process 400 may be performed by software, hardware, firmware, or any combination thereof. For illustrative purposes, the following description of the process 400 may refer to elements mentioned above in connection with FIGS. 1-3. In practice, portions of the process 400 may be performed by different elements of the described system, e.g., a script executing device or module, a commanded device or module, or a logical processing component thereof. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 will be described in the context of an environment such as that shown in FIG. 1. Thus, the following description of the process 400 assumes that the script executes at a local executing device that includes a script manager and a results array (which may be realized in an abstraction layer) that cooperate with a remote commanded device. The exemplary embodiment of the process 400 begins by obtaining or accessing an executable script that is to be executed (task 402). The script includes instructions for at least one asynchronous operation. The script may also include instructions for at least one synchronous operation. In certain embodiments, the script is written as sequential lines of code such that each operation is defined by, or otherwise corresponds to, a respective line of code. Thus, the script may be considered to be a software program that defines a number of sequential operations (including at least some asynchronous operations). The script may begin with an initial or beginning line of code corresponding to a first operation, and end with a final line of code corresponding to a final operation. Moreover, it should be appreciated that any given line of code in the script could represent a synchronous operation or an asynchronous operation.

For illustrative purposes and ease of understanding, the process 400 will be described with reference to the following simple and generic script:

1: ASYNCHRONOUS OPERATION 1
    2: SYNCHRONOUS OPERATION 1
    3: ASYNCHRONOUS OPERATION 2
    4: SYNCHRONOUS OPERATION 2

Of course, a script may include any number of operations including more or less than two synchronous calls, and including any number of asynchronous calls. The example provided here is short and simple for the sake of brevity.

Referring again to FIG. 4, the process 400 obtains the script and begins the first provisional iteration of the script (task 404). As used here, a "provisional iteration" refers to a run-through of at least a portion of the script, with operations performed as needed. In certain embodiments, each provisional iteration is performed sequentially in accordance with the sequential lines of code that define the script. Provisional iterations are performed to obtain the results requested by asynchronous operations in a manner that need not actually re-execute previously executed operations. As explained in more detail below, the exemplary embodiment performs one provisional iteration for each asynchronous operation in the script. Moreover, each provisional iteration of the script obtains and saves a respective result as a cached result for subsequent use during the process 400. Thus, two provisional iterations of the script are performed for the example provided above.

Each provisional iteration of the script begins at the first or beginning line of code, the first operation, the first instruction, or the like. Accordingly, the process 400 gets the first operation for handling (task 406). Moreover, each provisional iteration sequentially executes the script (to perform at least one of the sequential operations) until arriving at instructions for the first asynchronous operation. To this end, the process 400 may determine whether the current operation is an asynchronous operation (query task 408). If not, then the process 400 assumes that the current operation is synchronous, performs the designated synchronous operation (task 410), and continues to a query task 426 (described in more detail below). Notably, execution of the synchronous operation does not require a result and, therefore, the current provisional iteration of the script need not be halted at this time.

If the process 400 determines that the current operation is asynchronous (the "Yes" branch of query task 408), then the process continues by determining whether the corresponding result for the first asynchronous operation is already saved as a first cached result (query task 412). The results array contains no cached results at the outset and, therefore, the "No" branch of query task 412 is followed at this time. When the result for the first asynchronous operation is not already cached, the process 400 executes and performs the first asynchronous operation to issue an appropriate request for the corresponding result (task 414). Alternatively or additionally, the first asynchronous operation may be executed to direct an appropriate command to the commanded device/module, where execution of the command by the commanded device/module generates the corresponding result.

After executing the first asynchronous operation, the process 400 terminates, stops, or pauses execution of the first iteration of the script (task 416). Stopping the script at this point enables the process 400 to obtain and cache the associated result. In practice, the asynchronous nature of the operation contemplates a variable time delay between execution of the operation and return of the associated results. The ellipses in FIG. 4 represent this unknown period of time. This description assumes that the requested result is eventually received by the executing device (task 418) and saved as a first cached result in the results array (task 420).

After a result has been cached, the process 400 may continue by checking whether all of the results have already been cached (query task 422). In practice, the script manager may simply check the results array at this point to determine whether all of the listed results have been cached. If not, then the process 400 returns to task 404 to begin the next provisional iteration of the script. In accordance with the exemplary script provided above, the first provisional iteration merely executes and caches the first result corresponding to ASYNCHRONOUS OPERATION 1. Consequently, the process 400 will return to task 404 because at this time the results array does not contain a result for ASYNCHRONOUS OPERATION 2.

Although this example assumes that the first line of the script represents an asynchronous operation, there may instead be one or more synchronous operations at the beginning of the script. Note that the first provisional iteration of the script continues until it reaches and executes the first asynchronous operation, regardless of the number of preceding synchronous operations. Each subsequent provisional iteration of the script is performed sequentially, beginning with the first operation in the script. Following the example set forth above, the second provisional iteration of the script will follow the path defined by task 404, task 406, the "Yes" branch of query task 408 (because the first operation is asynchronous), and the "Yes" branch of query task 412 (because the first result corresponding to ASYNCHRONOUS OPERATION 1 has already been cached). Consequently, the second provisional iteration of the script will retrieve and use the first cached result (task 424) rather than re-execute ASYNCHRONOUS OPERATION 1. In other words, the cached result is utilized without issuing another request for the result and without having to communicate with the commanded device/module. This allows the script manager to quickly, easily, and efficiently leverage cached results while performing subsequent provisional iterations of the script.

Following task 424, the process 400 determines whether more operations need to be performed during the current provisional iteration of the script (query task 426). If there is at least one more operation in the sequence, then the "Yes" branch of query task 426 is followed and the process returns to task 406 to get the next operation for handling. If no subsequent operations remain (the "No" branch of query task 426), then the process 400 leads to query task 422 to check whether all of the results are cached, as described previously. In accordance with the example provided above, the "Yes" branch of query task 426 is followed at this time because the second, third, and fourth operations still remain. At this point, task 406 is repeated to initiate handling of SYNCHRONOUS OPERATION 1. Thereafter, the second provisional iteration of the script will proceed with the path defined by the "No" branch of query task 408 (because the second operation is synchronous), perform SYNCHRONOUS OPERATION 1 (task 410), and again follow the "Yes" branch of query task 426 (because the third and fourth operations still remain). Thereafter, the second provisional iteration of the script will follow the path defined by task 406, the "Yes" branch of query task 408 (because the third operation is asynchronous), and the "No" branch of query task 412 (because the result corresponding to ASYNCHRONOUS OPERATION 2 has not been cached yet).

Notably, the second provisional iteration of the script proceeds, using cached results if available, until it reaches the next asynchronous operation for which no cached result exists. At this point, the process 400 continues as described above for the first asynchronous operation. In other words, ASYNCHRONOUS OPERATION 2 is executed to issue the corresponding request, the second provisional iteration of the script is halted, and the second result is received and cached. Thereafter, query task 422 confirms that all of the results are cached for the asynchronous operations, and the process 400 performs a final iteration of the script (task 428).

Notably, the final iteration of the script is performed using the cached results corresponding to the asynchronous operations of the script. More specifically, the final iteration of the script uses the cached result for ASYNCHRONOUS OPERATION 1 without actually re-executing the operation and without issuing another request for the first cached result. Similarly, the final iteration of the script uses the cached result for ASYNCHRONOUS OPERATION 2 without actually re-executing the operation and without issuing another request for the second cached result. Thus, each cached result will be used during a provisional iteration of the script and/or during the final iteration of the script. In practice, the final iteration of the script is performed sequentially in accordance with the sequential lines of code. For this particular example, the final iteration of the script will begin with ASYNCHRONOUS OPERATION 1 and end with SYNCHRONOUS OPERATION 2.

A practical implementation of the system described here could handle asynchronous calls that return a plurality of results, where all of the corresponding results are cached as described above for subsequent reuse. As another option, the script manager could handle nested asynchronous calls, loops in a script, or the like. Furthermore, the methodology described here could be implemented to handle random numbers, random values, or the like. In such embodiments, however, the random values provided or generated the first time during a provisional iterations are saved and fixed (rather than being randomly regenerated at each subsequent provisional iteration). This ensures that the "random" values do not change with each iteration and that anything dependent on such "random" values does not vary from iteration to iteration. In other words, fixing the "random" values in this manner ensures that different execution paths are not triggered, and that the results stack is not corrupted by the iterative processing of the script.

The methodology presented here allows a script manager (or other logical construct) to "execute" a script having one or more asynchronous operations in a manner that does not require the script to be written in a customized or specialized way. Rather, a script that includes asynchronous operations (with or without any synchronous operations) can be written using traditional techniques that typically apply to synchronous operations. Although some redundant processing is employed, the script management and handling approach presented here represents an efficient and effective way to accommodate script developers who may be unfamiliar with modern asynchronous scripting techniques and methodologies.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method comprising:
   obtaining a script to be executed, the script comprising instructions for a plurality of asynchronous operations, wherein each asynchronous operation includes a request calling for a result;
   performing a plurality of provisional iterations of the script, wherein each provisional iteration of the script comprises performing at least one of the plurality of asynchronous operations, obtaining a result for the at least one of the plurality of asynchronous operations, and caching the result in a storage device;
   determining whether results for each of the plurality of asynchronous operations has been cached in the storage device; and
   in response to determining that the results for each of the plurality of asynchronous operations has been stored in the storage device, performing a final iteration of the script using the cached results stored in the storage device.

2. The computer-implemented method of claim 1, wherein the script further comprises instructions for at least one synchronous operation.

3. The computer-implemented method of claim 1, wherein:
   the plurality of asynchronous operations includes a request calling for a corresponding result generated by a remote computing device.

4. The computer-implemented method of claim 1, wherein:
   the script to be executed comprises sequential lines of code;
   each asynchronous operation is defined by a respective one of the lines of code;
   each provisional iteration of the script is performed sequentially in accordance with the sequential lines of code; and
   the final iteration of the script is performed sequentially in accordance with the sequential lines of code.

5. The computer-implemented method of claim 1, wherein:
   the script to be executed comprises sequential lines of code;
   each asynchronous operation is defined by a respective one of the lines of code;
   each provisional iteration of the script begins at a beginning line of code of the sequential lines of code; and
   the final iteration of the script begins with the beginning line of code.

6. The computer-implemented method of claim 1, wherein, for each provisional iteration of the script, the method comprises:
   sequentially executing the script until arriving at an instruction for a first asynchronous operation;
   determining whether the corresponding result for the first asynchronous operation is already saved as a first cached result;
   when the corresponding result for the first asynchronous operation is already saved as a first cached result, retrieving and using the first cached result without issuing another request for the first cached result; and
   when the corresponding result for the first asynchronous operation is not already saved as a first cached result, performing the first asynchronous operation and issuing a request for the corresponding result.

7. The computer-implemented method of claim 1, wherein, for each provisional iteration of the script, the method comprises:
   sequentially executing the script until arriving at an instruction for a first asynchronous operation; and
   when the corresponding result for the first asynchronous operation is not already saved as a first cached result, terminating execution of the script.

8. The computer-implemented method of claim 7, further comprising, when the corresponding result for the first asynchronous operation is not already saved as a first cached result:
   receiving a requested result corresponding to the first asynchronous operations; and
   caching the requested result for use as the first cached result during either a subsequent provisional iteration of the script or the final iteration of the script.

9. A non-transitory computer-readable storage medium with executable instructions stored thereon, wherein the executable instructions instruct a processor to manage a script having a plurality of asynchronous operations including at least a first asynchronous operation and a second asynchronous operation, wherein each of the asynchronous operations calls for a corresponding result such that completion of the script is associated with a plurality of results, and wherein the executable instructions instruct the processor to perform a method comprising:
   performing a first provisional iteration of the script to execute the first asynchronous operation and issue a first request calling for a first result;
   terminating execution of the first provisional iteration of the script;
   receiving the first result in response to issuing the first request;
   caching the received first result to obtain a cached first result;
   thereafter, performing a second provisional iteration of the script, wherein the second provisional iteration of the script uses the cached first result, executes the second asynchronous operation, and issues a second request for a second result;
   terminating execution of the second provisional iteration of the script;
   receiving the second result in response to issuing the second request;
   caching the received second result to obtain a cached second result; and
   thereafter, performing a final iteration of the script using the cached first result and the cached second result.

10. The non-transitory computer-readable storage medium of claim 9, wherein the script further comprises a synchronous operation.

11. The non-transitory computer-readable storage medium of claim 10, wherein:

performing the first provisional iteration of the script executes the synchronous operation.

12. The non-transitory computer-readable storage medium of claim 10, wherein:
performing the second provisional iteration of the script executes the synchronous operation.

13. The non-transitory computer-readable storage medium of claim 9, wherein:
the script comprises sequential lines of code;
each of the asynchronous operations is defined by a respective one of the lines of code;
each provisional iteration of the script is performed sequentially in accordance with the sequential lines of code; and
the final iteration of the script is performed sequentially in accordance with the sequential lines of code.

14. The non-transitory computer-readable storage medium of claim 9, wherein:
the script comprises sequential lines of code;
each of the asynchronous operations is defined by a respective one of the lines of code;
each provisional iteration of the script begins at a beginning line of code of the sequential lines of code; and
the final iteration of the script begins with the beginning line of code.

15. The non-transitory computer-readable storage medium of claim 9, wherein the second provisional iteration of the script uses the cached first result without issuing another request for the first result.

16. The non-transitory computer-readable storage medium of claim 9, wherein the final iteration of the script uses the cached first result without issuing another request for the first result, and uses the cached second result without issuing another request for the second result.

17. A computer-implemented method of simulating synchronous execution of asynchronous operations, the method comprising:
obtaining an executable script comprising sequential operations beginning with an initial operation and including at least a first asynchronous operation and a second asynchronous operation;
performing a first provisional iteration of the script to execute at least some of the sequential operations, beginning with the initial operation and continuing until execution of the first asynchronous operation;
terminating the first provisional iteration of the script in response to execution of the first asynchronous operation;
caching a first result generated in response to execution of the first asynchronous operation;
thereafter, performing a second provisional iteration of the script to execute at least some of the sequential operations, beginning with the initial operation and continuing until execution of the second asynchronous operation;
terminating the second provisional iteration of the script in response to execution of the second asynchronous operation; and
caching a second result generated in response to execution of the second asynchronous operation.

18. The method of claim 17, further comprising:
performing a final iteration of the script after caching the second result, wherein performing the final iteration of the script begins with the initial operation and uses the cached first result and the cached second result.

19. The method of claim 17, wherein performing the second provisional iteration of the script uses the cached first result without re-executing the first asynchronous operation.

20. The method of claim 17, wherein:
the first asynchronous operation is executed at a first computing device to issue a request to a second computing device;
the method further comprises the first computing device receiving the first result from the second computing device in response to issuing the request; and
caching the first result comprises caching the first result received from the second computing device.

* * * * *